May 23, 1950  E. J. ZIEGLER  2,508,634
TANDEM AXLE VEHICLE
Filed May 13, 1946  2 Sheets-Sheet 1
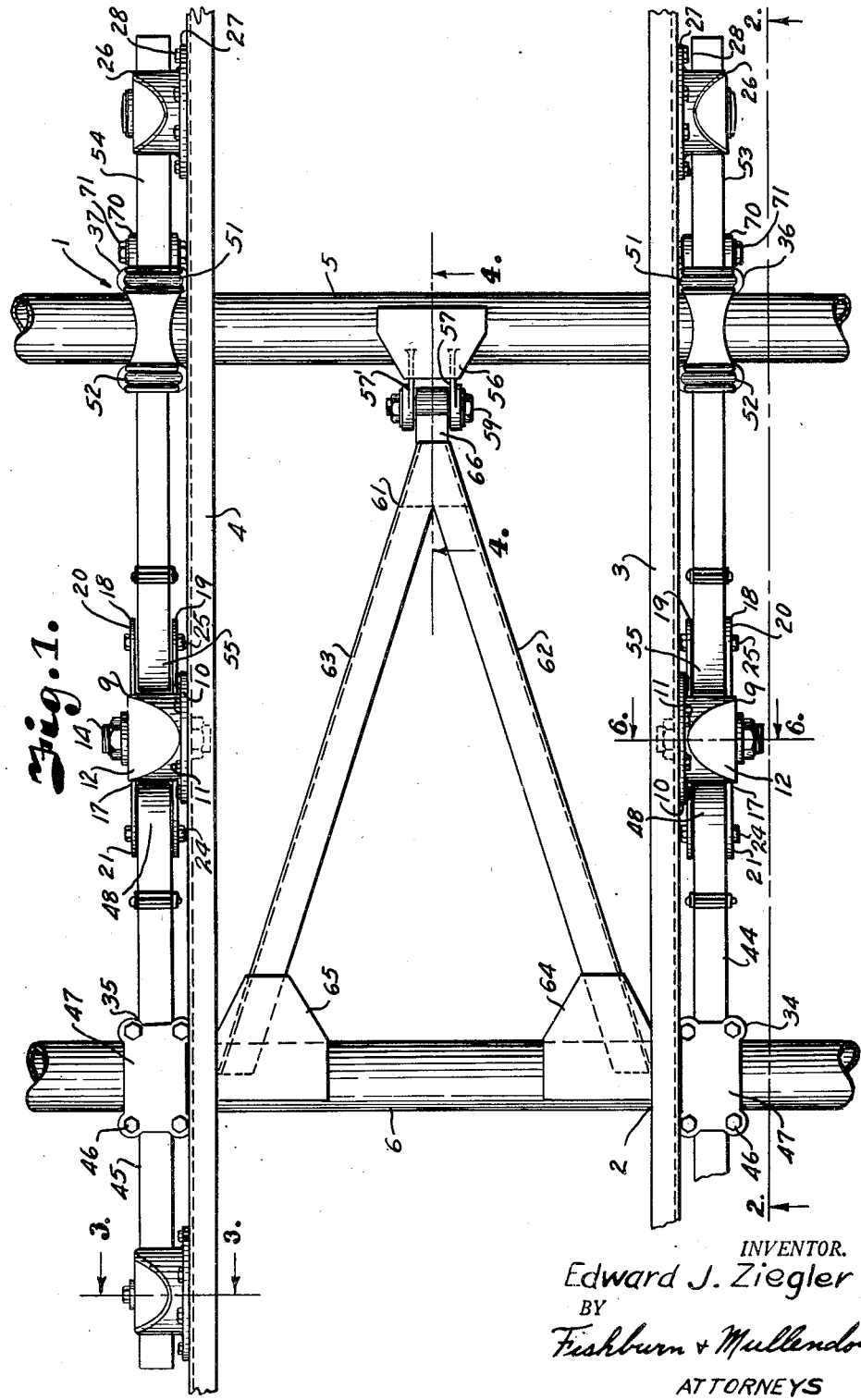
INVENTOR.
Edward J. Ziegler
BY
Fishburn + Mullendore
ATTORNEYS May 23, 1950
E. J. ZIEGLER
2,508,634
TANDEM AXLE VEHICLE
Filed May 13, 1946
2 Sheets-Sheet 2
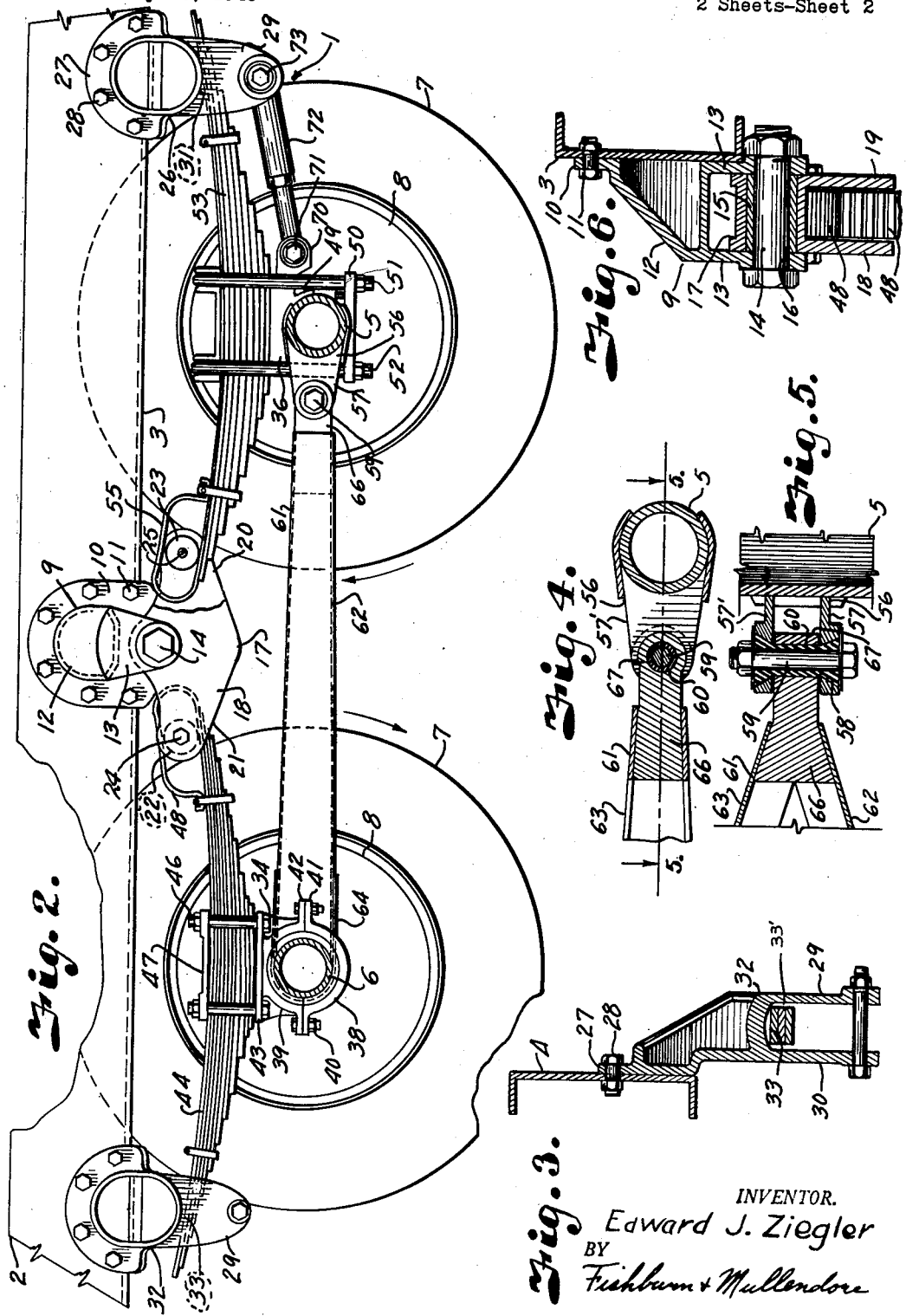
INVENTOR.
Edward J. Ziegler
BY
Fishburn + Mullendore
ATTORNEYS Patented May 23, 1950

2,508,634

UNITED STATES PATENT OFFICE 2,508,634

TANDEM AXLE VEHICLE

Edward J. Ziegler, Kansas City, Mo.

Application May 13, 1946, Serial No. 669,315

7 Claims. (Cl. 280—104.5)

This invention relates to tandem axle vehicles and has for its principal objects to provide a tandem axle structure wherein the load is balanced on the respective axles; to provide for direct tow of the axles from the frame of the vehicle; to provide for equalization of brake torque between the axles; to provide for towing of the rear axle through a torque member from the front axle; to provide a resilient connection between the torque member and the front axle; and to provide a construction wherein the brake torque is transferred independently of the spring mounting of the axles.

Other objects of the invention are to provide for limited lateral movement of the rear axle to assure perfect tow of the rear axle from the front axle of the tandem when turning corners; and to provide spring hangers shaped to facilitate centering of the springs to assure tracking of the rear wheels with the front wheels when the vehicle is moving in a straightaway direction.

In accomplishing these and other objects of the invention, I have provided improved structure, the preferred form of which is illustrated in the accompanying drawings wherein:

Fig. 1 is a plan view of the rear portion of a trailer vehicle embodying the features of the present invention.

Fig. 2 is a longitudinal section on the line 2—2 of Fig. 1.

Fig. 3 is a vertical section through the rear hanger brackets.

Fig. 4 is a section through the rear axle tow member connection with the front axle.

Fig. 5 is a section on the line 5—5 of Fig. 4.

Fig. 6 is a section through one of the rocker arms and its hanger bracket.

Referring more in detail to the drawings:

1 designates the rear portion of a trailer vehicle including a frame 2 having laterally spaced longitudinal sills 3 and 4. Extending transversely beneath the frame is a pair of tandem axles 5 and 6 which may be of tubular construction as shown in the drawings. The ends of the axles carry wheels 7 that are journalled thereon in any suitable manner and which are provided with the customary braking mechanisms 8 for retarding rotation of the wheels.

Fixed to the side sills 3 and 4 of the frame at points intermediate the axles are hanger brackets 9. The brackets 9 include plate-like portions 10 attached to the outer faces of the sills by fastening devices such as bolts 11. Extending outwardly from the plate-like portions 10 is a head 12 carrying laterally spaced depending ears 13 for carrying pivot members 14. The pivot members 14 may comprise bolts mounting bushings 15 and which are supported in openings 16 of the ears. Oscillatably supported on the bushings are rockers 17, each comprising laterally spaced plates 18 and 19 having forwardly and rearwardly extending arms 20 and 21 to carry rollers 22 and 23, the rollers being mounted on bolts 24 and 25.

Carried on the side members 3 and 4 of the frame, to the front of the brackets 9 are brackets or hangers 26 which include plate portions 27 secured to the sides of the frame by fastening devices such as bolts 28 and which have laterally spaced depending ears 29 and 30 on the respective sides of a spring seat 31. Also mounted on the side members of the frame to the rear of the brackets are similar hangers 32 of substantially the same construction as the front hangers but which have spring seats 33 that are transversely arched to facilitate centering of the springs as later described. The seats of the rear brackets are wider than the springs to permit lateral shifting of the rear axle when trailing the front axle on a curve. The ears 29 and 30 for the rear brackets are also spaced apart to provide ample clearance at the sides of the springs as indicated at 33'. Carried on the axles substantially in alignment with the spring hangers are spring seats 34—35 and 36—37.

The spring seats 34 and 35 for the rear axle include mating sections 38 and 39 embracing the axle to form bearings in which the axle is adapted to oscillate. The sections are secured together by fastening devices such as bolts 40 extending through mating flanges 41 and 42 on the respective sections. The upper sections carry spring seating plates 43 to which springs 44 and 45 are clamped by bolts 46 extending through the plate and through clamping plates 47 at the tops of the springs. The springs include a plurality of leaves and have their rear ends projecting between the ears of the rearmost hangers as shown in Fig. 3. The forward ends of the rear springs terminate in loops 48 for retaining the rollers 22 previously described.

The spring seats for the front axles include clamping sections 49 and 50 that rigidly engage the axle by U-bolts 51 and 52 that extend over the front springs 53 and 54. The springs are constructed like the rear spring but are reversely arranged with respect thereto in that they have their forward ends bearing on the seat portions of the front brackets and the loop portions 55 extending rearwardly to engage the rollers 23 of the equalizing mechanism.

With the structure thus far described, the load carried on the vehicle will be evenly distributed on the axles through the rockers 17 but braking action on the rear wheels tends to lift the load off the front wheels incidental to movement of the rockers. For example, when the brakes are applied there is a tendency for the axles to turn in the direction of the arrows. Therefore, the forward ends of the rear springs tend to move downwardly in the direction of rotation and lower the rear ends of the rockers. This movement of the rockers raises the forward ends and releases the pressure of the load on the rear ends of the front springs so that the load is lifted from the front axle and reduces traction on the front wheels and consequently, the braking action on the front wheels is not effective at such times.

In order to overcome this difficulty, means is provided for counteracting the effect of the braking action on one axle by that of the other axle and at the same time provide means whereby the front axle is towed from the frame and the rear axle is towed from the front axle as now to be described.

Fixed to and projecting rearwardly from the center of the front axle is a torque arm 56 having laterally spaced ears 57 and 57′ mounting the ends of a pivot member 59 having its axis extending parallel with that of the axle as best shown in Fig. 1. Mounted on the pivot member and having ends supported in bearing openings 58 of the ears is a bushing 60 formed of resilient material and resiliently connecting a torque arm 61 that is fixed to the rear axle.

The torque arm 61 includes forwardly and inwardly extending members 62 and 63 having rear ends spaced apart and rigidly connected with the rear axle by gusset plates 64 and 65. The forward ends are joined together to form the apex of a triangle and carry a draft head 66 having a sleeve-like bearing 67 engaging over the resilient bushing 60 as best shown in Fig. 4 whereby the axles are connected together so that the rear axle is towed from the front axle. The bushing 60 has its ends compressed within tapered sockets 58 in the head of the torque arm 56 by a bolt 59 that extends through the bushing. The bushing 60 provides sufficient resiliency so that the rear axle may shift laterally to permit the rear axle to trail the front axle when turning corners or traveling on curving highways.

In order that the front axle may be towed from the frame, the upper sections of the front spring seats are provided with forwardly extending ears 70. Connected with the ears 70 by a pivot pin 71 are radius arms 72 having their forward ends connected with pivot pins 73 carried between the depending ears of the foremost spring hangers. With this construction, the springs are substantially free of draft and perform the function of resiliently supporting the load on the axles. When the brakes are applied, the tendency for the rear axle to rotate moves the torque arm 61 carried thereby downwardly to resist corresponding turning movement of the front torque arm 56 so that the forces nullify each other and the braking action on one wheel has no effect upon the braking action of the other wheels. The lateral movement of the rear axle provides for flexibility necessary for the rear wheels to trail the front wheels of the tandem and eliminates lateral thrusts and binding of the springs during turning movement; however, when the vehicle is moving in a straight-away direction, the arch shape of the spring seats of the rear spring hangers automatically centers the rear springs so that the rear wheels trail the front wheels.

From the foregoing it is obvious that I have provided a tandem axle apparatus wherein the load is balanced on the axles.

It is also obvious that the front axle is towed and aligned with respect to the frame by the adjustable radius rods and that the rear axle is towed so that it at all times follows the front axle without placing lateral strains on the springs or their hangers.

It is also obvious that the brake torque is equalized between the axles so that the braking action on all wheels is substantially uniformly effective and that none of the brake torque is transferred through the springs or their connecting rocker arms.

What I claim and desire to secure by Letters Patent is:

1. In a vehicle of the character described, a frame, a pair of axles arranged in tandem under the frame, wheels mounted on ends of the axles, springs extending transversely at the ends of the axles and having ends connected with the frame, journals carried by the rear springs and mounting the rear axle for turning movement, laterally spaced tow arms connected with the front axle and with the frame, a torque arm fixed to the front axle and projecting toward the rear axle, a torque arm fixed to the rear axle and extending toward the front axle, and means pivotally connecting the torque arms together whereby tendency for the rear axle to rotate is counteracted by the torque arms.

2. In a vehicle of the character described, a frame, a pair of axles arranged in tandem under the frame, wheels mounted on ends of the axles, springs extending transversely at the ends of the axles and having ends connected with the frame, journals carried by the rear springs and mounting the rear axle for turning movement, laterally spaced tow arms connected with the front axle and with the frame, a torque arm fixed to the front axle and projecting toward the rear axle, a torque arm fixed to the rear axle and extending toward the front axle and means pivotally connecting the torque arms together whereby tendency for the rear axle to rotate is counteracted by the torque arms, and resilient means carrying the pivot means in one of said torque arms.

3. In a vehicle of the character described, a frame, a pair of axles arranged in tandem under the frame, wheels mounted on ends of the axles, springs extending transversely at the ends of the axles and having connection with the frame, tow arms connected with ends of the front axle and with the sides of said frame, a torque arm bracket fixed to the front axle intermediate the tow arms, torque arms connected with the rear axle at the ends thereof and having forwardly and inwardly extending ends connected with the torque arm bracket.

4. In a vehicle of the character described, a frame, a pair of axles arranged in tandem under the frame, wheels mounted on ends of the axles, hangers at sides of the frame intermediate the axles, load equalizing means connected with the frame, springs extending transversely at the ends of the axles and having adjacent ends connected with the load equalizing means, means for connecting other ends of the springs with the frame, tow arms connected with ends of the front axle and with the sides of said frame, a torque arm bracket fixed to the front axle intermediate the tow arms, torque arms connected with the rear axle at the ends thereof and having forwardly and inwardly extending ends connected with the torque arm bracket.

5. A tandem axle mounting including a pair of axles arranged in tandem, wheels mounted on ends of the axles, brakes for said wheels, tow means connected with ends of the front axle, and tow means connecting the rear axle for tow by the front axle and for counteracting the brake torque on one axle by the brake torque on the other axle, comprising a torque arm extending rearwardly from the front axle, a torque arm extending forwardly from the rear axle pivot and means connecting said arms.

6. In a vehicle of the character described, a frame, a pair of axles arranged in tandem, wheels rotatably mounted on ends of said axles, resilient means connecting the axles with the frame, tow means connected with the foremost axle, brakes for said wheels, a torque member having rigid connection with the front axle, a torque member having rigid connection with the rear axle and extending forwardly to connect with the torque member of the front axle, and a pivot member extending transversely through the torque members for flexibly connecting the torque members together whereby brake torque on one axle is counter-acted by brake torque on the other axle and the rear axle is towed from the front axle.

7. In a vehicle of the character described a frame, a pair of axles arranged in tandem, wheels rotatably mounted on the ends of the axles, resilient means connecting the axles with the frame, tow means connected with the foremost axle, said rear axle having slight turning movement relative to the frame for following the front axle, brakes for said wheels, a torque member having rigid connection with the front axle, a torque member having rigid connection with the rear axle and extending forwardly to connect with the torque member of the front axle, and means flexibly connecting the torque members together including means for preventing relative longitudinal movement between said torque members whereby brake torque on one axle is counteracted by brake torque on the other axle and the rear axle is towed from the front axle.

EDWARD J. ZIEGLER.

REFERENCES CITED

The following references are of record in the file of this patent:

UNITED STATES PATENTS

| Number | Name | Date |
| --- | --- | --- |
| 1,761,135 | Le Moon | June 3, 1930 |
| 1,847,348 | Marcum | Mar. 1, 1932 |
| 1,877,970 | Reid | Sept. 20, 1932 |
| 1,901,309 | Le Moon | Mar. 14, 1933 |
| 2,065,924 | Knox | Dec. 29, 1936 |
| 2,132,580 | Runyan | Oct. 11, 1938 |
| 2,239,286 | Freitag | Apr. 22, 1941 |
| 2,269,728 | Mills | Jan. 13, 1942 |